(12) United States Patent
Morris et al.

(10) Patent No.: US 7,800,888 B2
(45) Date of Patent: Sep. 21, 2010

(54) MOTOR CONTROL CENTER SUBUNIT HAVING VISIBLE CONTACT DISCONNECTION AND METHOD OF MANUFACTURE

(75) Inventors: Robert A. Morris, Fayetteville, NC (US); Edgar Yee, Chapel Hill, NC (US)

(73) Assignee: Eaton Corporation, Cleveland, OH (US)

( * ) Notice: Subject to any disclaimer, the term of this patent is extended or adjusted under 35 U.S.C. 154(b) by 90 days.

(21) Appl. No.: 12/270,306

(22) Filed: Nov. 13, 2008

(65) Prior Publication Data

US 2010/0118473 A1 May 13, 2010

(51) Int. Cl.
*H02B 13/02* (2006.01)
(52) U.S. Cl. .................. 361/614; 361/601; 361/622
(58) Field of Classification Search .............. 361/614, 361/622
See application file for complete search history.

(56) References Cited

U.S. PATENT DOCUMENTS

| | | | |
|---|---|---|---|
| 3,303,395 A | 2/1967 | Eck | |
| 3,308,348 A * | 3/1967 | Olashaw et al. ........ | 361/614 |
| 3,469,043 A | 9/1969 | Wilson | |
| 3,482,143 A | 12/1969 | Stark et al. | |
| 3,495,135 A | 2/1970 | Paape | |
| 3,626,253 A | 12/1971 | Sturdivan | |
| 3,633,075 A | 1/1972 | Hawkins | |
| 3,896,353 A | 7/1975 | Burton et al. | |
| 4,024,441 A | 5/1977 | Coyle et al. | |
| 4,038,585 A | 7/1977 | Wolski et al. | |
| 4,068,287 A | 1/1978 | Kruzic et al. | |
| 4,077,687 A | 3/1978 | Farag | |
| 4,090,230 A | 5/1978 | Fuller et al. | |
| 4,118,607 A | 10/1978 | Shaffer | |
| 4,121,276 A | 10/1978 | Kovatch et al. | |
| 4,178,624 A | 12/1979 | Wilson et al. | |
| 4,180,845 A | 12/1979 | Shariff et al. | |
| 4,233,643 A | 11/1980 | Iverson et al. | |
| 4,292,661 A | 9/1981 | Johnson et al. | |
| 4,355,269 A | 10/1982 | Burton et al. | |
| 4,427,854 A | 1/1984 | Kleinecke et al. | |
| 4,447,858 A | 5/1984 | Farag et al. | |
| 4,502,097 A | 2/1985 | Takahashi | |
| 4,621,303 A | 11/1986 | Rowe | |
| 4,652,966 A | 3/1987 | Farag et al. | |
| 4,693,132 A | 9/1987 | Buxton et al. | |
| 4,713,501 A | 12/1987 | Herrmann | |
| 4,728,757 A | 3/1988 | Buxton et al. | |
| 4,743,715 A | 5/1988 | Gerbert-Gaillard et al. | |
| 4,760,220 A | 7/1988 | Fritsch et al. | |

(Continued)

FOREIGN PATENT DOCUMENTS

DE  10006427 C2  8/2001

*Primary Examiner*—Gregory D Thompson
(74) *Attorney, Agent, or Firm*—Ziolkowski Patent Solutions Group, SC

(57) ABSTRACT

A motor control center subunit includes a subunit housing configured to fit within a motor control center. The housing has a front panel. The motor control center subunit also includes a drive mechanism attached to the subunit housing. The drive mechanism is configured to control a plurality of line connectors to move between a retracted position and an extended position when the subunit housing is seated in the motor control center and the front panel of the subunit housing is in a closed position. A window is disposed in the front panel of the subunit housing and is positioned to provide a view of the plurality of line connectors.

24 Claims, 11 Drawing Sheets

U.S. PATENT DOCUMENTS

| | | | |
|---|---|---|---|
| 4,768,967 A | 9/1988 | Fritsch | |
| 4,789,344 A | 12/1988 | Fritsch et al. | |
| 4,789,919 A | 12/1988 | Cox et al. | |
| 4,853,830 A | 8/1989 | Corfits et al. | |
| 4,860,161 A | 8/1989 | Maki et al. | |
| 4,926,286 A | 5/1990 | Maki et al. | |
| 5,019,676 A | 5/1991 | Heckenkamp | |
| 5,124,881 A * | 6/1992 | Motoki | 361/605 |
| 5,337,210 A | 8/1994 | Ishikawa et al. | |
| 5,424,910 A | 6/1995 | Lees | |
| 5,424,911 A | 6/1995 | Joyner et al. | |
| 5,459,293 A | 10/1995 | Hodkin et al. | |
| 5,481,075 A | 1/1996 | Kleinecke et al. | |
| 5,486,663 A | 1/1996 | Fritsch et al. | |
| 5,495,388 A | 2/1996 | Bonetti et al. | |
| 5,510,960 A | 4/1996 | Rosen | |
| 5,530,414 A | 6/1996 | Reynolds | |
| 5,539,614 A * | 7/1996 | Ishikawa et al. | 361/620 |
| 5,568,033 A | 10/1996 | Brunson | |
| 5,592,360 A | 1/1997 | Beck et al. | |
| 5,625,531 A * | 4/1997 | Padilla et al. | 361/623 |
| 5,642,256 A | 6/1997 | Pugh et al. | |
| 5,691,686 A * | 11/1997 | Ishikawa et al. | 336/90 |
| 6,015,958 A | 1/2000 | Pomatto et al. | |
| 6,087,602 A | 7/2000 | Bernier et al. | |
| 6,141,206 A * | 10/2000 | Bruner et al. | 361/605 |
| 6,207,909 B1 | 3/2001 | Tallman et al. | |
| 6,284,989 B1 | 9/2001 | Bernier et al. | |
| 6,414,839 B1 | 7/2002 | Derksen | |
| 6,423,913 B1 * | 7/2002 | Gupta et al. | 200/50.11 |
| 6,433,999 B1 * | 8/2002 | Muse et al. | 361/624 |
| 6,435,631 B1 | 8/2002 | Yee et al. | |
| 6,512,669 B1 | 1/2003 | Goodwin et al. | |
| 6,531,670 B1 | 3/2003 | Pugh | |
| 6,551,111 B1 | 4/2003 | Watanabe | |
| 6,700,062 B1 | 3/2004 | Allen, Jr. | |
| 6,717,076 B2 | 4/2004 | Narusevicius et al. | |
| 6,831,226 B2 | 12/2004 | Allen, Jr. | |
| 6,861,596 B2 | 3/2005 | Schnackenberg | |
| 6,864,443 B1 | 3/2005 | Bruchmann | |
| 6,878,891 B1 | 4/2005 | Josten et al. | |
| 6,951,990 B1 | 10/2005 | Miller | |
| 7,019,230 B1 | 3/2006 | Vaill et al. | |
| 7,292,422 B2 | 11/2007 | Culligan et al. | |
| 7,311,538 B2 | 12/2007 | West | |
| 7,337,450 B2 | 2/2008 | Sato et al. | |
| 7,466,554 B2 | 12/2008 | Matsumoto et al. | |
| 7,525,809 B2 | 4/2009 | Bergmann et al. | |
| 7,544,908 B2 | 6/2009 | Webb et al. | |
| 2002/0021548 A1 * | 2/2002 | Muse et al. | 361/641 |
| 2004/0166729 A1 | 8/2004 | Allen, Jr. | |
| 2004/0201972 A1 | 10/2004 | Walesa | |
| 2006/0067018 A1 | 3/2006 | Malkowski, Jr. et al. | |

* cited by examiner

MOTOR CONTROL CENTER SUBUNIT HAVING VISIBLE CONTACT DISCONNECTION AND METHOD OF MANUFACTURE

BACKGROUND OF THE INVENTION

The present invention relates generally to motor control systems, and more particularly, to a motor control center subunit having a viewing window. In one embodiment, the system and method described herein provides a line-of-sight to internal components of the motor control center subunit, so that a user can monitor the connection status of the motor control components when the motor control center subunit is fully installed and sealed within a motor control center.

A motor control center is a multi-compartment steel enclosure with a bus system to distribute electrical power, on a common bus system, to a plurality of individual motor control units mountable within the compartments. The individual motor control center subunits are commonly referred to as "buckets" and are typically constructed to be removable, pull-out units that have, or are installed behind, individual sealed doors on the motor control center enclosure. These buckets may contain various motor control and motor protection components such as motor controllers, starters, contactor assemblies, overload relays, circuit breakers, motor circuit protectors, various disconnects, and similar devices for electric motors. The buckets connect to the supply power lines of the motor control center and conduct supply power to the line side of the motor control devices, for operation of motors. Motor control centers are most often used in factories and industrial facilities which utilize high power electrical motors, pumps, and other loads.

Typically, when installing or removing motor control center buckets, the power supply lines are connected. To remove such a bucket, a deadfront door of the bucket or of the motor control center is opened and an operator manually pulls on the bucket to separate the primary disconnects, or "stabs," from the bus system, thereby disconnecting the power supply. Installation of a bucket is accomplished in a similar manner, wherein the operator manually pushes the bucket into a compartment of the motor control center to engage the bucket stabs with the bus system, thus connecting the system to supply power. In such systems it may be difficult to determine when the bucket is fully disconnected from the power supply.

Attempts have been made to improve upon the manual installation and disconnection of motor control center buckets and supply power connections from live supply power lines, risers, and/or a vertical bus of a motor control center. Other systems have employed pivotable handles inside the buckets to pivot line connectors to and from supply lines. However, many of these systems require that the bucket or compartment door be open to manipulate the handles and line stabs.

It would therefore be desirable to design a motor control center bucket assembly that overcomes the aforementioned drawbacks. Thus, it would be desirable to provide for remote connection or disconnection of the line stabs of a bucket when the bucket door is sealed. Further, it would be desirable to provide a view port in the bucket door to allow an operator to visually determine that the bucket connectors are fully disengaged from the power supply prior to removing the bucket from the motor control center.

BRIEF DESCRIPTION OF THE INVENTION

The present invention provides a system and method for installing a motor control center subunit or bucket into a motor control center and electrically connecting motor control components of the bucket to a power supply. The system and method utilize moveable line stabs to engage the power supply (such as a series of bus bars) after the bucket has been secured in the motor control center, in order to contain potential arc flashes. A view port located in a front panel of the bucket allows an operator to determine when motor control center components are fully disconnected from the power supply.

Therefore, in accordance with one aspect of the present invention, a motor control center subunit includes a subunit housing configured to fit within a motor control center. The housing has a front panel. The motor control center subunit also includes a drive mechanism attached to the subunit housing. The drive mechanism is configured to control a plurality of line connectors to move between a retracted position and an extended position when the subunit housing is seated in the motor control center and the front panel of the subunit housing is in a closed position. A window is disposed in the front panel of the subunit housing and is positioned to provide a view of the plurality of line connectors.

In accordance with another aspect of the invention, a motor control center includes a frame enclosing a supply power bus. The frame has at least one compartment within which a subunit housing is constructed to seat. The motor control center also includes at least one conductive contact disposed within the subunit housing. An actuating mechanism is attached to the subunit housing and is configured to move the at least one conductive contact between an engaged position and a disengaged position. A view port is disposed within the subunit housing and is configured to permit a visual confirmation of the disengaged position.

According to a further aspect of the invention, a method of manufacturing a motor control center subunit is provided. The method includes constructing a motor control subunit to seat in a motor control center, constructing a front panel for the motor control subunit, disposing a viewing window within the front panel, locating at least one conductive connector within the motor control center subunit, and providing for advancement of the at least one conductive connector when the front panel is in a closed and locked position to supply power to the motor control subunit.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The following description makes reference to supply power, supply power lines, motor power, load power, line power, and the like. It is appreciated that such terms may refer to a variety of both common and uniquely conditioned voltage and current characteristics, including but not limited to, three phase AC power, single phase AC power, DC power, multiple DC power lines, or any combination thereof. Such power characteristics will be generally referred to as being provided on a bus, supply line, or riser of a motor control center. However, it is appreciated that the present invention may find applicability in other power connectivity configurations, adapted or apart from motor control centers. An example of supply power commonly used in motor control centers is 480V three-phase AC power distributed over three separate supply bus bars. In addition, references to "motor control components" shall be understood to include the various types of devices and control components which may be housed in a motor control center bucket for connection to the supply power. Such devices and components include contactors, relays, motor controllers, disconnects, circuit protective devices, and the like.

Figure 1:
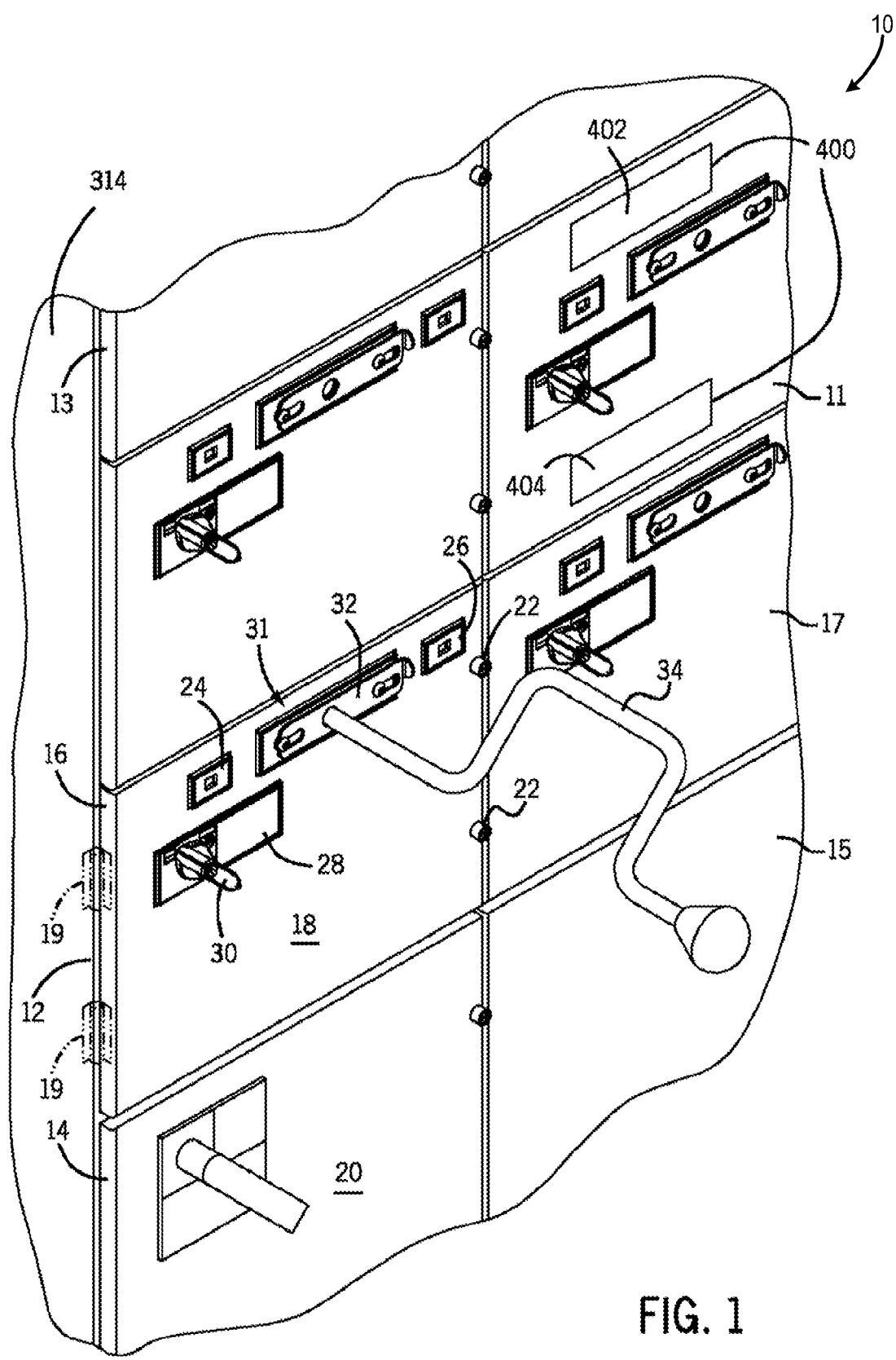
FIG. 1 is a partial perspective view of a number of motor control center subunits installed in a motor control center.

Referring to FIG. 1, a partial perspective view of a motor control center structure 10 is shown. As discussed above, motor control centers are generally formed of a frame 314 that may include compartments or enclosures for multiple control modules or buckets 11, 13, 14, 15, 16, 17. Bucket 16 is shown fully installed into motor control center compartment or enclosure 12 such that its front panel 18 is seated securely against the periphery of enclosure 12 and flush with the front panel 20 of bucket 14. In this regard, bucket 16 includes a number of latching mechanisms 22 on front panel 18 so that an operator may lock bucket 16 into place once installed. In some embodiments, front panel 18 may be a deadfront door having a set of hinges 19 in order to permit access to motor control components within bucket 16 while bucket 16 is installed in enclosure 12 of motor control center 10. However, even when closed or sealed, front panel or door 18 still permits access to stab indicator 24, shutter indicator 26, and line contact actuator 31, and opening/closing of fused disconnect 28 by way of disconnect handle 30. Line contact actuator 31 is a mechanism for engaging line contacts (FIG. 2) with line power from the motor control center 10. Thus, even when bucket 16 is fully installed in enclosure 12 and latches 22 have been secured, an operator may still use disconnect handle 30 and may open slide 32 to insert crank 34 to move one or more line contacts (not shown) of the bucket 16. When slide 32 is moved aside to permit access to actuating mechanism 31, door 18 is prevented from opening, thereby closing off access to components inside bucket 16. Additionally, a user may desire to padlock the slide 31 in the closed position, to further regulate who may operate actuating mechanism 31 and when.

As further shown in FIG. 1, the front panel 18 of bucket 11 also includes a plurality of view ports 400 that provide a line of sight to motor control components within bucket 16 while bucket 16 is installed in enclosure 12 of motor control center 10. The plurality of view ports 400 includes therein a retractable stab viewport 402 that provides an operator a view of retractable stabs (not shown) in the bucket 16, as will be explained in greater detail below. While only one retractable stab viewport 402 is depicted in FIG. 1, it is contemplated that an individual bucket 11 may have multiple retractable stab viewports 402 located on either the front panel 18 or on other exterior surfaces of the bucket 11 to provide a user with multiple viewing locations of the motor control components. The plurality of view ports 400 also includes a fused disconnect viewport 404 that that provides an operator a view of fused disconnect 28, allowing for visual verification of whether the fused disconnect is in an "open" or "closed" position. The view ports 400 can be formed of a variety of transparent materials, and according to an exemplary embodiment, are formed of a polycarbonate material.

Figure 2:
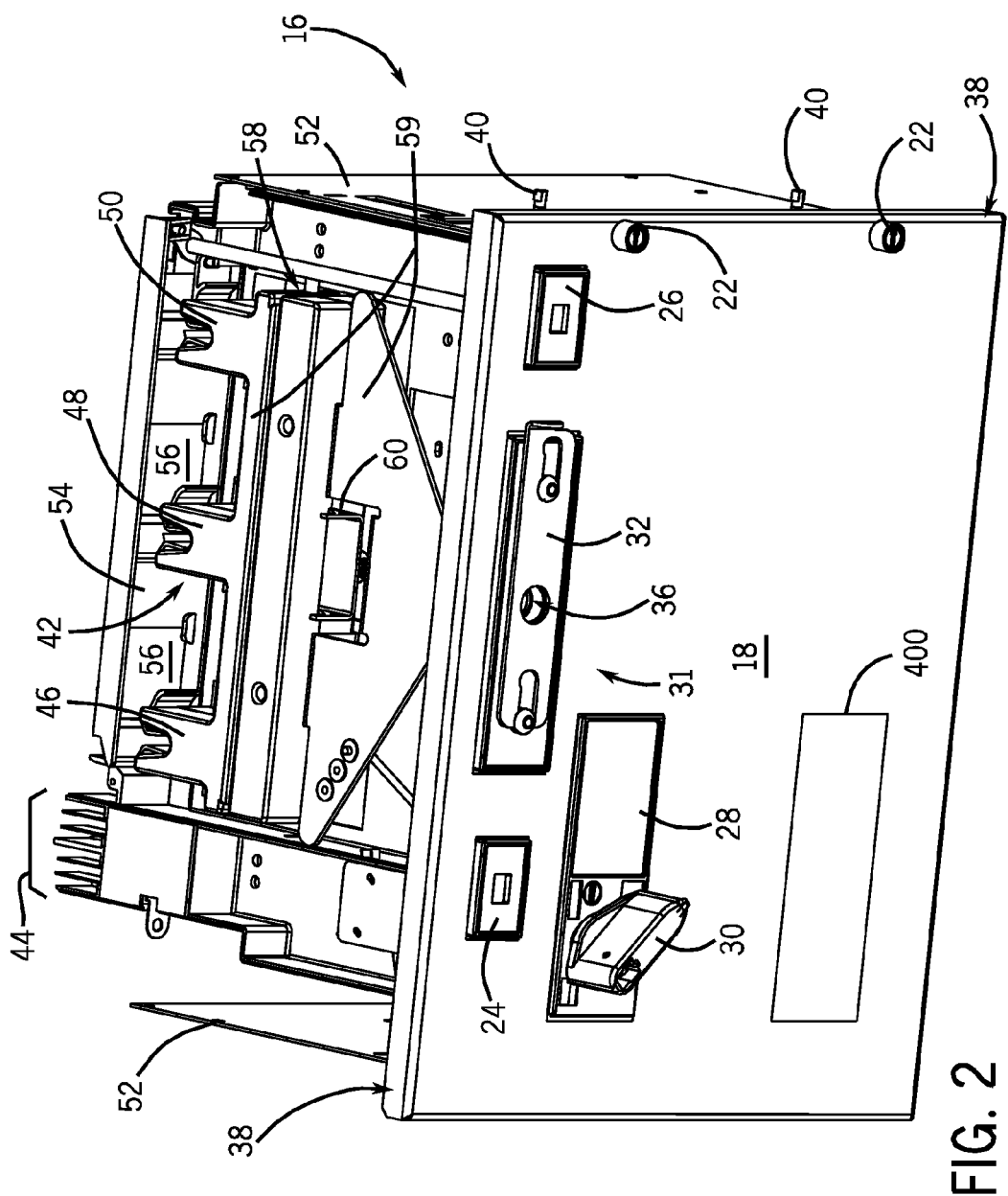
FIG. 2 is a perspective view of a motor control center subunit of FIG. 1, removed from the motor control center.
Figure 6:
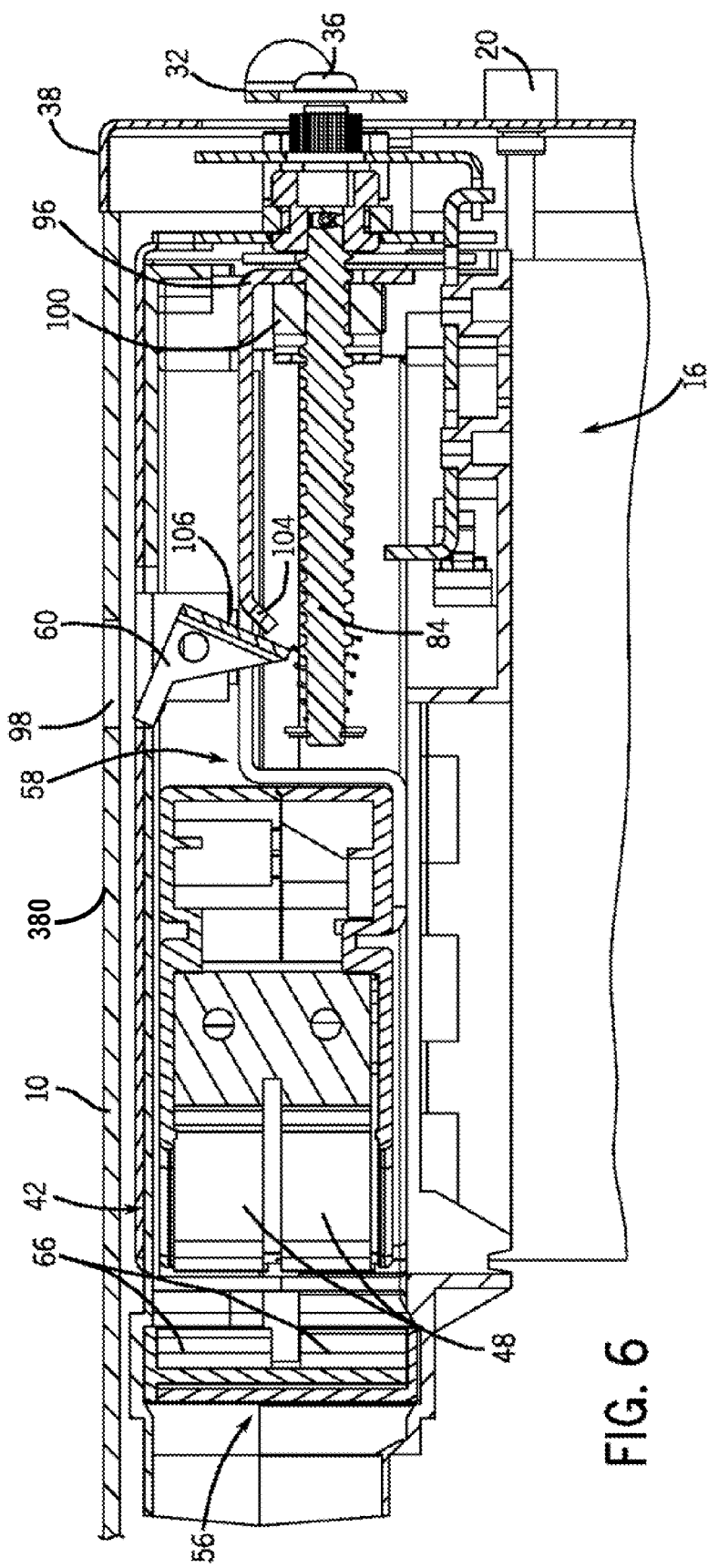
FIG. 6 is a cross-sectional view of the motor control center subunit of FIG. 3 taken along line 6-6 of FIG. 3.

Referring now to FIG. 2, a perspective view of a motor control center bucket 16 is shown. It is noted that bucket 16 may have a housing that includes a number of panels surrounding bucket 16 to fully or partially enclose the components thereof. As shown, bucket 16 includes a pair of side panels 52 and a front panel 18, which support motor control devices and internal bucket components. An upper panel and a rear panel have been removed to show the internal components of bucket 16. Front panel 18 is configured to fit snugly and securely within a motor control center such that a rim 38 of the front panel 18 seats against the inner periphery (not shown) of a motor control center enclosure. For purposes of dust protection, rim 38 may optionally include a compressible or flexible seal, such as a rubber seal, or other gasket-type component. Once bucket 16 is inserted into a motor control center enclosure, latch mechanisms 22 may be turned with a key, a screwdriver, or by hand so that latch arms 40 abut an inner surface of the outer periphery (not shown) of an enclosure to hold bucket 16 in place and/or prevent bucket 16 from being removed. Similarly, an automatic retention latch 60 is shown in an engaged position. Upon advancement of line contacts or stabs 46, 48, 50 automatic retention latch 60 is triggered to engage a frame or divider pan 380 (as shown in FIG. 6) that segregates upper and lower compartments of the motor control center unit in which bucket 16 is installed.

When slide 32 of line contact actuator 31 is moved aside, an opening 36 is exposed. Opening 36 preferably has a unique configuration to accept a specialized crank 34 (as shown in FIG. 1). Additionally, when slide 32 is moved aside as shown, slide 32 extends over a portion of front panel 18. Thus, in embodiments in which front panel 18 is a hinged door, moving slide 32 to expose opening 36 will inhibit a user from opening front panel 18. Accordingly, so long as an operator has a crank inserted into opening 36 of actuator 31, the operator cannot open the door of the bucket 16.

Bucket 16 also includes a number of conductive contacts or stabs 44, 46, 48, 50. Control power contact 44 is preferably fixedly attached to the rear of bucket 16, whereas supply power stabs 46, 48, 50 are moveable with respect to bucket 16. However, it is appreciated that control power contact 44 may also be moveable in a similar manner to line power stabs 46, 48, 50. Control power contact 44 is of a suitable construction to conduct a control power (typically a few volts) to motor control components (not shown) disposed within bucket 16. In embodiments where control power contact 44 is permanently positioned at the rear of bucket 16, control power contact 44 will engage a control power supply line or bus upon installation of bucket 16 into a motor control center.

Supply power stabs 46, 48, 50, on the other hand, do not initially engage supply power lines or buses when bucket 16 is installed into a motor control center. Rather, stabs 46, 48, 50 are initially in retracted position 42, disposed inside bucket 16. One skilled in the art will appreciate that a number of configurations of supply power stabs 46, 48, 50 may be utilized. In the embodiment shown, stabs 46, 48, 50 are shaped to grasp about a supply line, bus, or riser of the motor control center 10 of FIG. 1.

The stab assembly 58, in addition to stabs 46, 48, 50, also includes a stab bracket 59 to which the stabs 46, 48, 50 are attached. Stab bracket 59 holds stabs 46, 48, 50 in an orientation for subsequent engagement with the supply power lines or buses of motor control center 10 of FIG. 1. It is recognized, however, that stab assembly 58 of FIG. 2 may include any number of configurations, such as for independently moveable stabs, for other than three stabs, or for actuation by other than a shaft, as will be described below. A shutter or isolator assembly 54 is disposed in the rear of bucket 16, between stab assembly 58 and the exterior of bucket 16. Isolator assembly 54 includes a number of moveable shutters 56 which operate to either expose or isolate the stabs 46, 48, 50 from the power lines or buses of the motor control center 10 of FIG. 1.

Figure 3:
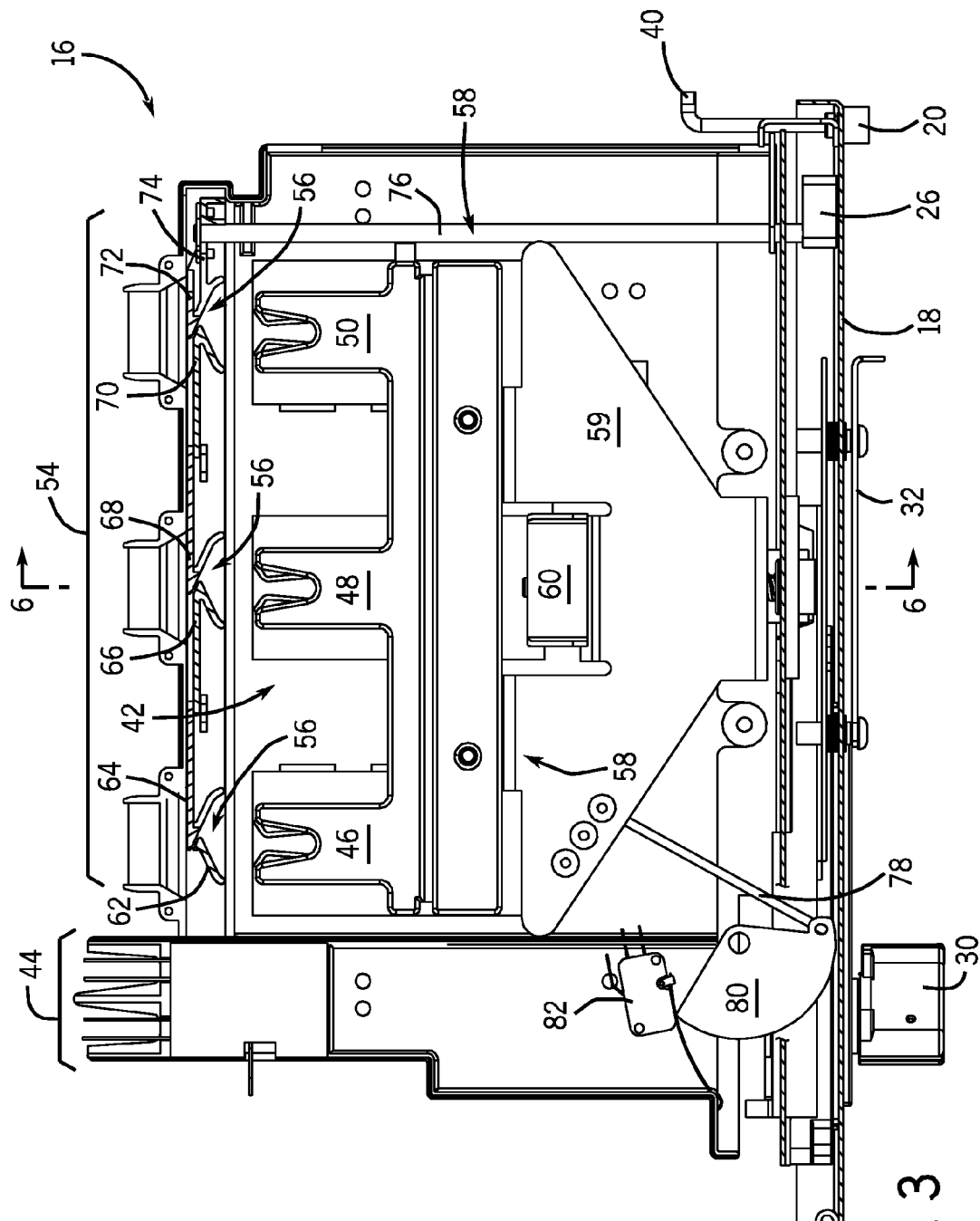
FIG. 3 is a top view of the motor control center subunit of FIG. 1 showing a number of stabs in a retracted position.

FIG. 3 depicts a top view of bucket 16, with all housing panels removed except for front panel or door 18. As shown, stab assembly 58 has positioned stabs 46, 48, 50 in a retracted position 42 wherein the stabs 46, 48, 50 are located inside bucket 16. Accordingly, shutters 56 of shutter assembly 54 are closed, isolating the stabs 46, 48, 50 from the supply power bus or line of a motor control center such as shown in FIG. 1. As shown in FIG. 3, each shutter 56 includes two separate shielding members 62 and 64, 66 and 68, 70 and 72. The shutter 56 for stab 46 includes a left shielding portion 62 and a right shielding portion 64, each being angled toward stab 46. Likewise the shutters 56 for stabs 48 and 50 include left shielding portions 66, 70 and right shielding portions 68, 72 respectively, each being angled toward the corresponding stab. However, the shutter 56 for stab 50 includes an additional mechanical connection 74. That is, a shutter arm 74 is provided to control a shutter indicating mechanism 76 which displays to an operator via front panel indicator 26 whether the shutters 56 are open or closed, as will be described in further detail below. Similarly, a cam or bell crank 80 is attached via rod 78 to stab assembly 58 to translate movement of the stab to a microswitch 82. Microswitch 82 operates to turn on and off the supply of control power from fused disconnect 28 to motor control components, such as contactors or overload relays (not shown), of bucket 16.

Figure 4:
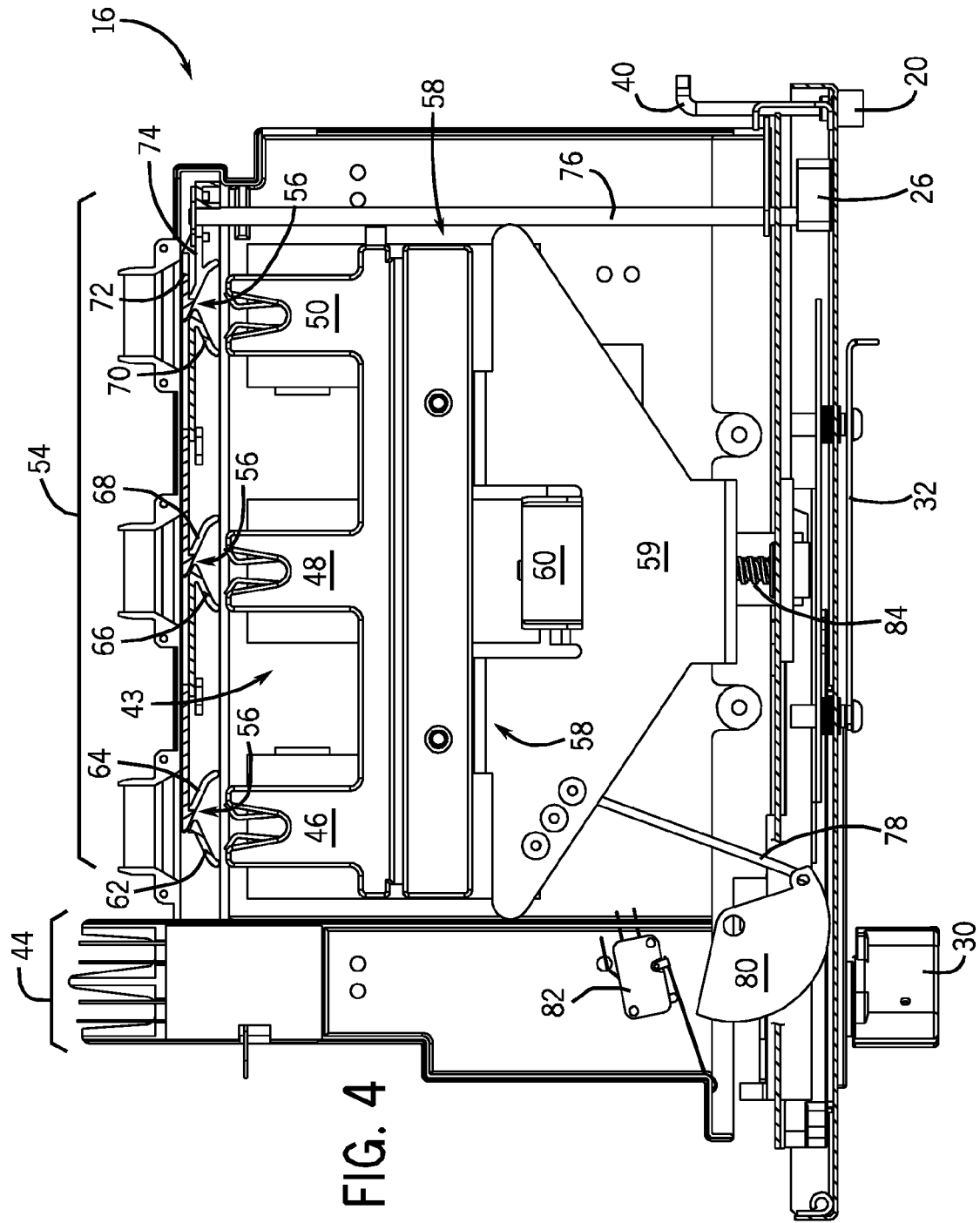
FIG. 4 is top view of the motor control center subunit of FIG. 3 showing the stabs in a test position.

Referring now to FIG. 4, the bucket 16 is shown having the stab assembly 58 in a test position 43. Stabs 46, 48, and 50 have been advanced to a point or test position 43 at which they nearly touch or just touch shutters 56, but shutters 56 are still closed. Since shutters 56 are closed, stabs 46, 48, 50 are isolated from supply power buses, thus preventing arcs from occurring between stabs 46, 48, 50 and the buses. Being in the test position, stab bracket 59 is moved forward such that actuating shaft or drive 84 is visible. Preferably, shaft 84 is a rotary drive shaft and is connected to the socket of opening 36 shown in FIG. 2 for operation via crank 34, shown in FIG. 1. Referring back to FIG. 4, during the advancement of stab assembly 58, automatic latch 60 has been triggered to engage the enclosure of the motor control center into which bucket 16 has been installed. Also due to the advancement of stab assembly 58, rod 78 is pulled by stab bracket 59 such that cam 80 has rotated away from microswitch 82. Microswitch 82 is thus actuated to permit control voltage from the control power contact 44 to a motor control component, such as a contactor or overload relay (not shown). It is appreciated, however, that microswitch 82, cam 80 and rod 78 are optional. In other words, embodiments of the present invention may simply permit control voltage to pass through control power contact 44 directly to motor control components immediately upon installation of bucket 16 into a motor control center when contact 44 engages a control power bus.

Figure 5:
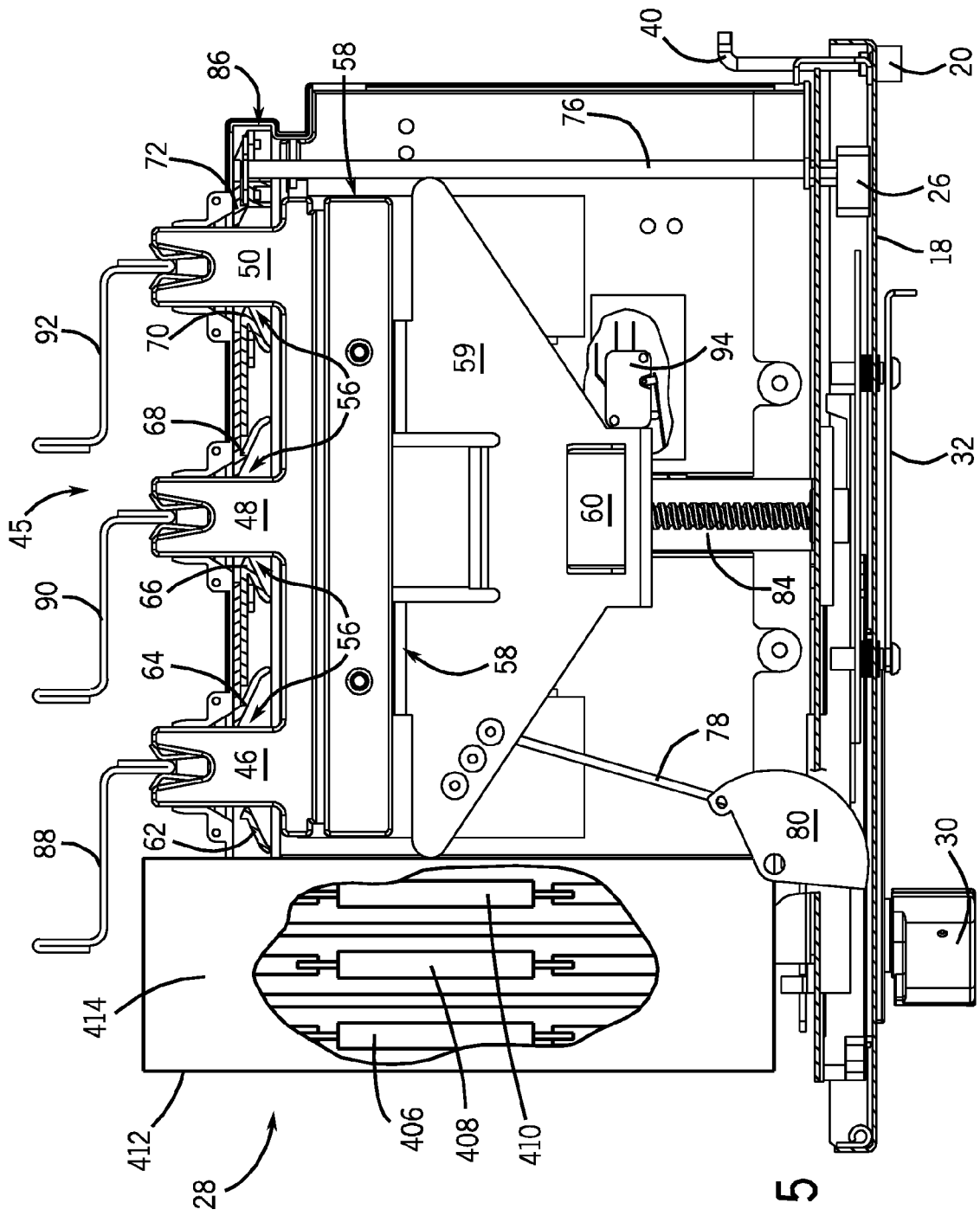
FIG. 5 is a top view of the motor control center subunit of FIG. 4 showing the stabs in an extended position.

FIG. 5 depicts another top view of the bucket 16 wherein the stabs 46, 48, 50 are in an extended/engaged position 45. In operation, stabs 46, 48, 50 are advanced or extended from the test position 43 of FIG. 4 towards shutters 56 and impinge upon angled portions 62-72 of the shutters 56. As the stabs 46, 48, 50 are forced forward into and against the surfaces of shutters 56, the stabs 46, 48, 50 separate the left angled portions 62, 66, 70 and right angled portions 64, 68, 72 of the shutters 56 to expose the stabs 46, 48, 50 to supply power buses 88, 90, 92, respectively. Preferably, a biasing or closure force is provided to bias the right angled portions 64, 68 72 and the left angled portions 62, 66, 70 towards one another, so that the shutters 56 automatically close upon retraction of stabs 46, 48, 50. It is recognized that numerous other ways of opening and closing shutters 56 are possible and contemplated. For example, rather than employing two shutter portions for each shutter, one shutter portion having one beveled surface could be slid aside by the advancement of the stabs. Or, the shutters could be connected for manipulation by the turning of rotary shaft 84. Thus, the shutters 56 could comprise one or several sliding panels with or without beveled surfaces. In other words, shutters 56 may be operated to open and close by the movement of the stabs, by the movement of the stab assembly, by the turning of the actuating shaft, by other actuating components, or by a manual control. Regardless, once the stabs 46, 48, 50 have penetrated through shutters 56, the stabs 46, 48, 50 may be advanced or extended to engage power supply bus bars 88, 90, 92.

Also shown in FIG. 5 is a second microswitch 94 connected to activate and deactivate fused disconnect 28. When stabs 46, 48, 50 reach the fully engaged position 45 with bus bars 88, 90, 92, stab bracket 59 of stab assembly 58 actuates microswitch 94. When actuated, microswitch 94 permits closure of circuit breaker 30, completing the circuit between bus bars 88, 90, 92 and the line side of motor control components (not shown) in bucket 16. Otherwise, microswitch 94 prevents closure of fused disconnect 28.

Fused disconnect 28 is shown in greater detail in FIG. 5 as an exemplary mechanism for providing control power to motor control components (not shown). According to an embodiment of the invention, fused disconnect 28 is in the form of a molded case fuse and includes therein fuses 406, 408, 410 associated with each phase of the control power. The fuses 406, 408, 410 are enclosed within a fuse housing 412, which includes a removable cover 414 that allows for access to the fused disconnect 28. Assembling fused disconnect 28 such that fuses 406, 408, 410 are enclosed within housing 412 creates a compact configuration, which is beneficial within the space constraints of the bucket 16. In an exemplary embodiment, fuses 406, 408, 410 are configured with IP20 grade protection, as "touch safe" or "finger safe" fuses.

For removal of bucket 16, circuit breaker 30 is opened, disconnecting supply power to the motor control devices (not shown) of bucket 16. Stabs 46, 48, 50 may then be retracted from bus bars 88, 90, 92 by a reverse motion of rotary shaft 84. Once stabs 46, 48, 50 pass shutters 56, the right and left portions 62-72 thereof will automatically close together to isolate the stabs from bus bars 88, 90, 92. Preferably, the shutter portions 62-72 and all or some of the housing panels, including front panel 18 and a rear panel (not shown), of bucket 16 are formed of plastic or another insulating material. After stabs 46, 48, 50 have been fully retracted, automatic latch 60 will release from engagement with the motor control center 10, and an operator may then slide bucket 16 out of the motor control center 10. Once the bucket 16 is slid out of the motor control center 10 to an open or semi-open position, the fuse housing 412 is accessible and an operator may remove the cover 414 of the housing 412 and replace fuses 406, 408, 410. As such, this configuration ensures supply power to the motor control devices is disconnected before the fuses 406, 408, 410 may be accessed by an operator.

Referring now to FIG. 6, a cross-sectional view of bucket 16 taken along line 6-6 of FIG. 3 is shown. The left angled portion 66 of a shutter 56 is shown isolating the central stab 48, since stab 48 is in the retracted position 42 of FIG. 3. In FIG. 6, it can be seen that stab assembly 58 holds stab 48 in position and engages rotary shaft 84, shown in section. Therefore, FIG. 6 illustrates the moving components used to actuate a stab 48. An operator may use a ratchet or crank (not shown) through opening 36 of slide 32 to turn rotary shaft or worm gear 84. A stab guide 96 includes a thread bearing 100 to transform the rotational motion of rotary shaft 84 into a translational motion of stab assembly 58. Thus, rotary shaft 84 and stab guide 96 may generally be referred to as a racking-type actuating mechanism for extending and retracting the stabs 46, 48, 50, relative to bucket 16. As stab assembly 58 is racked or otherwise advanced towards the extended or engaged position 45 shown in FIG. 5 (i.e. a motion to the left, as oriented in FIG. 6) stab 48 will impinge upon shutters 66. When stab assembly 58 is advanced, a sloped lip 104 of stab assembly 58 will strike a bottom portion 106 of automatic retention latch 60. As sloped lip 104 follows the advancing motion of the stab assembly 58, it will rotate retention latch 60 into an upward position wherein bottom portion 106 rests on stab guide 96 and latch 60 extends through a groove 98 of a divider pan 380 of the motor control center frame (FIG. 1) to retain bucket 16 therein.

Figure 7:
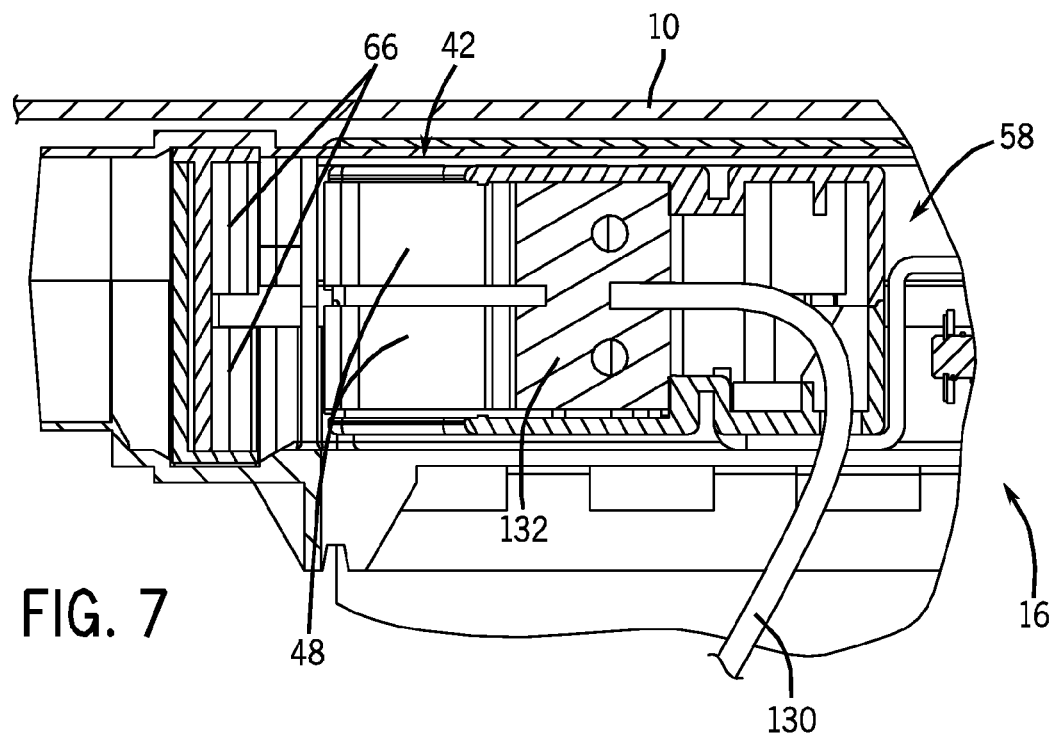
FIG. 7 is a detailed view of a portion of the motor control center subunit of FIG. 6 showing an arc shield, line contact, and supply conductor thereof.
Figure 8:
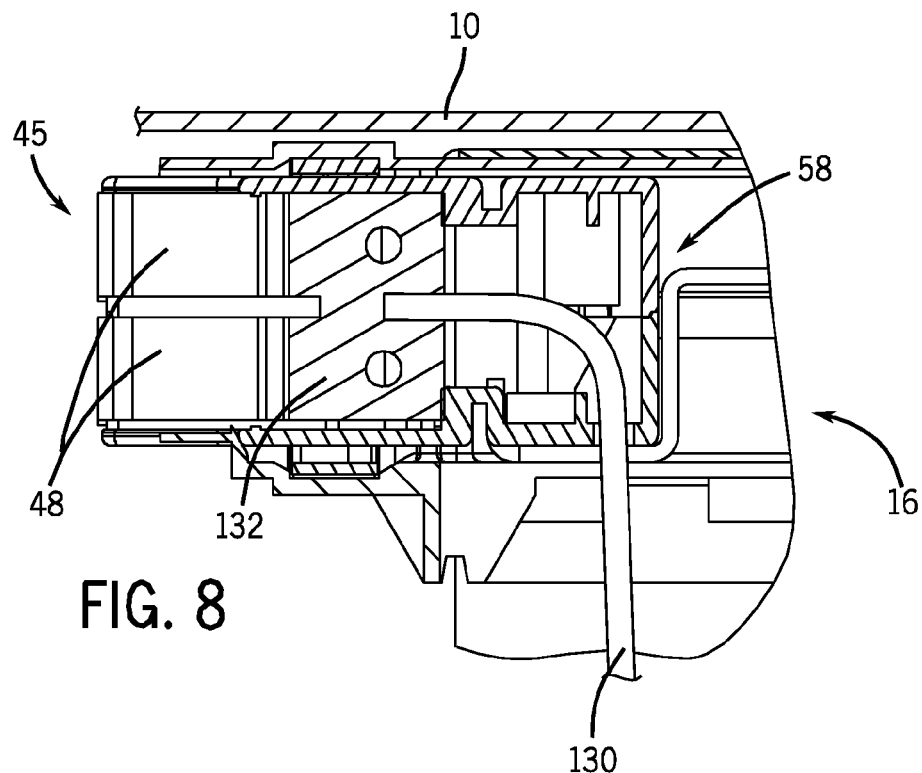
FIG. 8 is a detailed view of the motor control center subunit of FIG. 7 showing line contact extension.

FIG. 7 is an enlarged view of the stab 48 and shutter 66 area of the cross-sectional view of FIG. 6. Conductive stab 48 is coupled to a flexible conductor 130, such as a cable, via a coupling portion 132 of stab assembly 58. Flexible conductor 130 is of a construction suitable to conduct supply power, via stab 48, to the line side of a motor control component (not shown). As shown in FIG. 8, when stab 48 and stab assembly 58 are racked or otherwise advanced forward to an extended position 45, flexible conductor 130 flexes to maintain electrical connectivity with stab 48 via coupler 132. Accordingly, the motion of stab 48 relative to bucket 16 does not interfere with the connectivity of the stab 48 with a motor control component.

Figure 9:
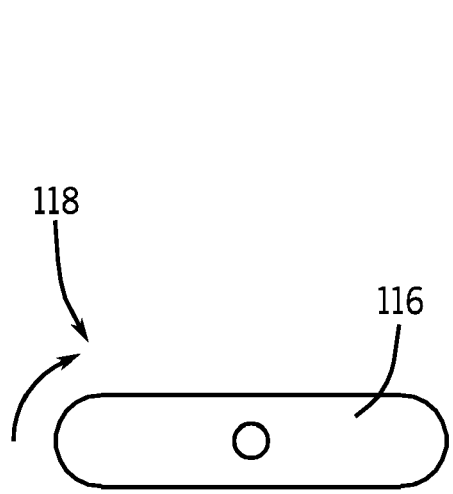
FIG. 9 is a plan view of a control handle of one embodiment of the present invention.
Figure 10:
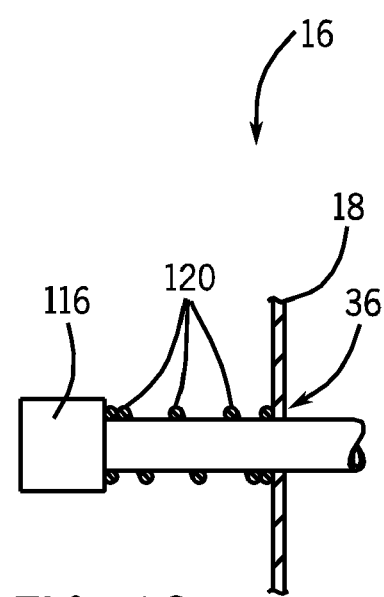
FIG. 10 is a side view of the control handle of FIG. 9.
Figure 11:
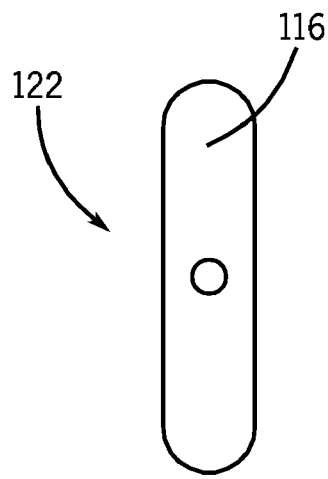
FIG. 11 is a plan view showing the control handle of FIG. 9 rotated ninety degrees.
Figure 12:
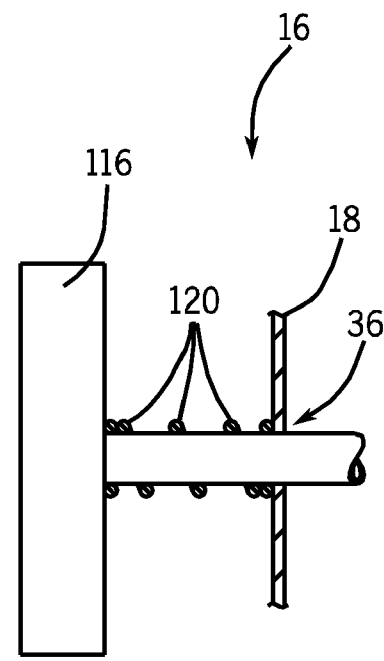
FIG. 12 is a side view of the control handle of FIG. 11.
Figure 13:
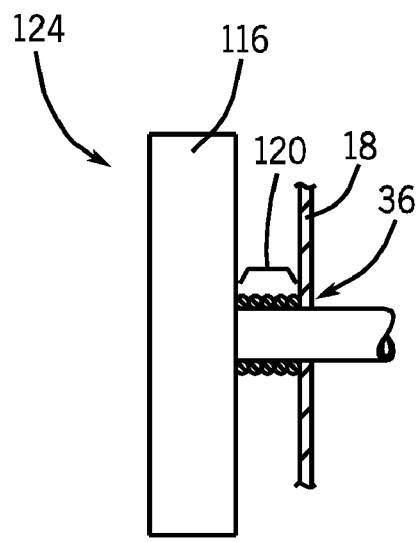
FIG. 13 is a side view showing the control handle of FIG. 11 depressed into a motor control center subunit.
Figure 14:
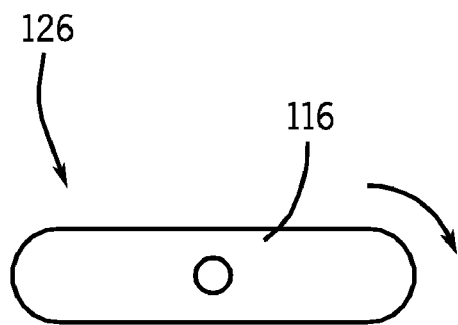
FIG. 14 is a plan view showing the control handle of FIG. 11 rotated ninety degrees.
Figure 15:
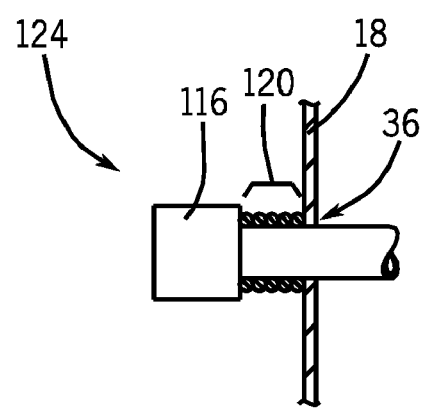
FIG. 15 is a side view of the control handle of FIG. 14.

Referring now to FIGS. 9-15, an alternative stab actuating feature is shown. A manually drivable handle 116 may replace or be used in combination with the crank 34 of FIG. 1 and racking mechanism of FIG. 6. In such embodiments, the rotary shaft or worm gear 84 depicted in previous embodiments may be replaced with a non-tapped shaft or rod directly connected to stab assembly 58. FIG. 9 shows such a handle 116 in a locked, starting position 118 that corresponds to the stabs disengaged position 42 of FIG. 3. As shown in FIG. 10, handle 116 is separated and biased from front panel 18 of a bucket by a spring 120 and extends through stab actuating opening 36. By rotating handle 116 ninety degrees, as shown in FIGS. 11 and 12, handle 116 may be unlocked 122. In some embodiments, an interlock system may be included to prevent unlocking of handle 116 until bucket 16 is fully installed into a motor control center. Such an interlock may be incorporated into the shaft 84 of handle 116. Once unlocked, handle 116 may be driven or depressed towards front panel 16, compressing spring 120, as shown in FIG. 14. The depressed position 124 of handle 116 corresponds to the stabs engaged position of FIG. 5. Handle 116 may then be rotated another ninety degrees 126, as shown in FIG. 15, to lock the handle in the stabs engaged position 124, against the force of spring 120. For disengagement of the stabs, handle 116 is rotated to unlocked orientation 122, pulled outward to the stab disengaged position 42 and turned ninety degrees to a locked position 118. In a general sense, therefore, embodiments of the present invention may include various configurations of simplified, manual actuation of the stabs, similar to that shown in FIGS. 9-15.

Figure 16:
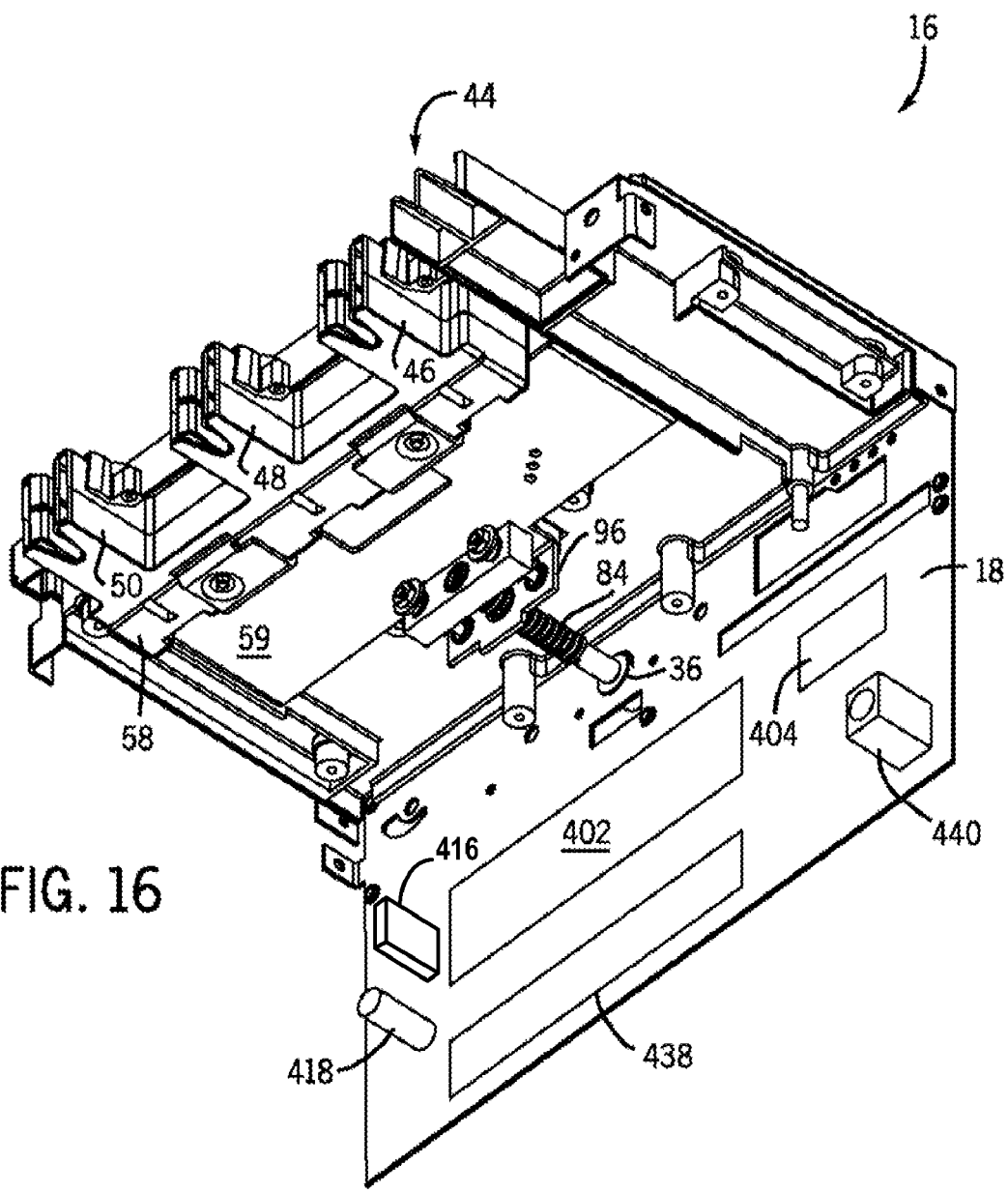
FIG. 16 is a rear perspective view of the motor control center subunit of FIG. 2.

Referring now to FIG. 16, a partial interior perspective view from the bottom of a motor control center bucket 16 is shown. For purposes of illustration, several components are not shown, including side panels, a top panel, a stab guide, and a fused disconnect. Therefore, circuit breaker handle 30 is visible through front door 18 of bucket 16. As shown, mirror 416 is affixed to door 18 and is positioned to provide a user with a view of stabs 46, 48, 50 through retractable stab view port 402. As such, an operator is able to visually determine whether the stabs 46, 48, 50 are connected with the supply power buses 88, 90, 92. While mirror 416 is shown affixed to door 18 in the present embodiment, mirror 416 may be positioned at numerous alternative locations within the bucket 16. Furthermore, it is contemplated that mirror 416 may be positioned at a range of different angles with respect to the retractable stab view port 402 to improve a viewing angle therethrough. It is further contemplated that the line of sight through retractable stab view port 402 may also be configured to provide a visual indication of other critical conditions of the stab assembly 58, as well as the functional wellness of the various internal components of the bucket 16. Additionally, according to an embodiment of the invention, a light source light source 418 is positioned within the motor control center 10 to illuminate components within the bucket 16 and assist with visibility of the stab assembly 58.

According to an embodiment of the invention, FIG. 16 also includes an optical micro camera 440, which is located within the bucket 16 and captures an image of internal components of the bucket 16. Optical camera 440 may be positioned to provide an image of the stab assembly 58, as an additional or alternative mechanism for viewing a position of the stab assembly 58 besides stab view port 402.

Figure 17:
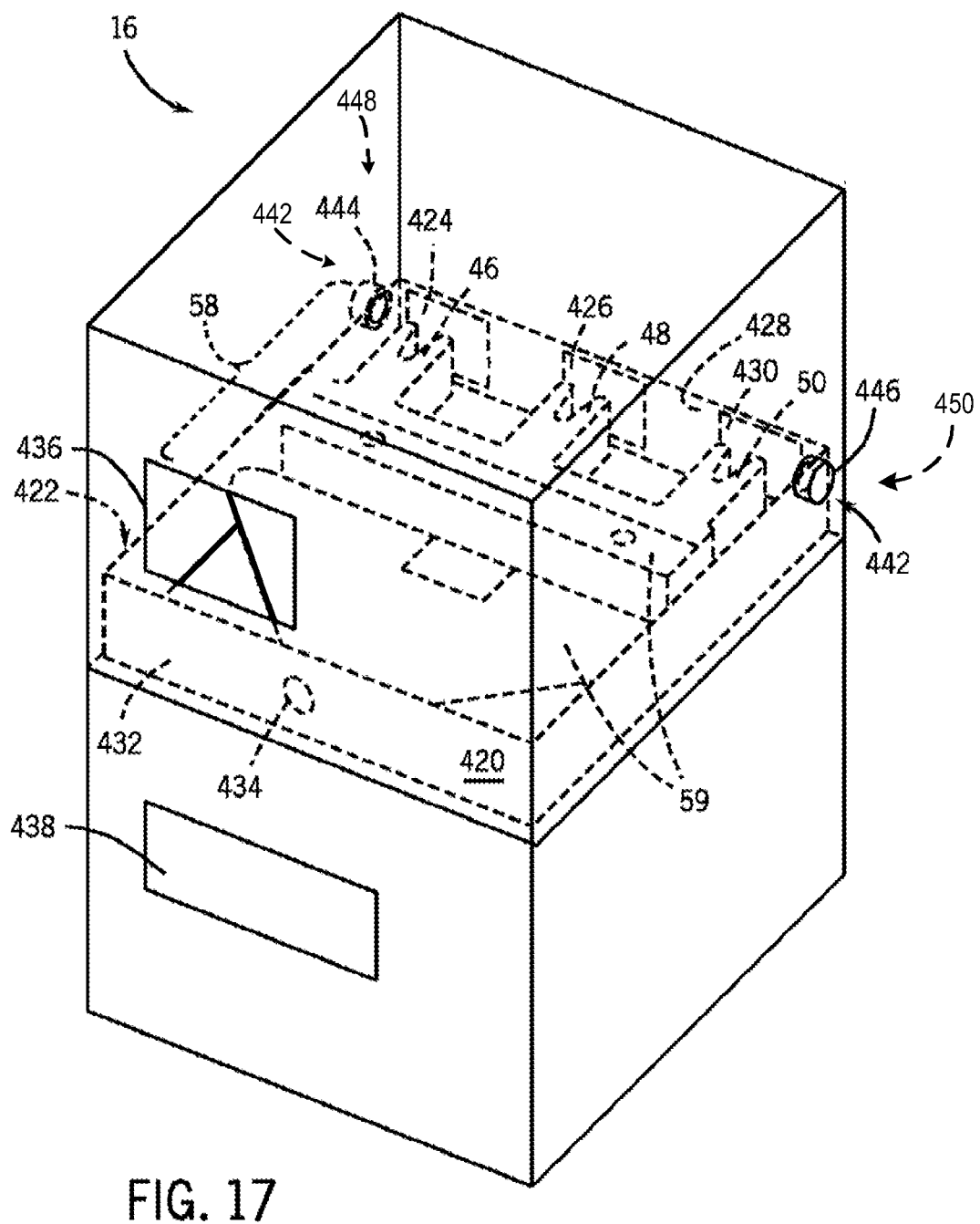
FIG. 17 is a perspective view of a stab assembly housing.

Referring now to FIG. 17, according to an embodiment of the invention, stab assembly 58 is shown enclosed within a clear polycarbonate stab housing 420. Together, stab assembly 58 and housing 420 form a modular unit 422 that can be installed within the bucket 16 and enables the stabs 46, 48, 50 to be visible in both connected and disconnected positions. The apertures 424, 426, 428 located on the rear surface 430 of housing 420 allow stabs 46, 48, 50 to extend beyond housing 420 to connect to supply power buses 88, 90, 92 (shown in FIG. 5). The front surface 432 of housing 420 contains an aperture 434 through which actuating mechanism 31 (shown in FIG. 1) may be inserted to engage with stab assembly 58.

As shown in FIG. 17, according to an embodiment of the invention, both a top retractable stab window 436 and a bottom retractable stab window 438 are provided on front panel 18 of bucket 16. It is contemplated that top window 436 and bottom window 438 may be positioned at various locations on bucket 16 to provide a clear line of sight from either window 436, 438 through the clear stab housing 420 to the stab assembly 58. By providing multiple stab windows 436, 438, the stab assembly 58 may be viewed from whichever window 436, 438 provides the best line of sight based on the operator's position and the location of the bucket 16 in the motor control center 10.

A sensor system 442 is also shown in FIG. 17 according to an embodiment of the invention. Sensor system 442 includes a light emitting diode (LED) 444 and a light detector 446, which may be positioned on opposing exterior surfaces 448 and 450 of the clear housing 420 such that sensor system 442 monitors a gap within housing 420 in which stabs 46, 48, 50 connect with supply busses 88, 90, 92 (shown in FIG. 5). According to an embodiment of the invention, sensor system 442 may be configured to monitor the connection between stabs 46, 48, 50 and supply power busses 88, 90, 92 and display a connection status to an operator. Sensor system 442 may be configured to indicate that stab assembly 58 is engaged or disengaged from the power supply if light detector 446 senses light or does not sense light emitted from LED 444. In an alternative embodiment, sensor system 442 may be configured to sense light emitted from the LED 444 only when a gap between stabs 46, 48, 50 and busses 88, 90, 92 is large enough to ensure that the bucket 16 is electrically isolated from the supply power.

Accordingly, one embodiment of the present invention includes a motor control center subunit that includes a subunit housing configured to fit within a motor control center. The housing has a front panel. The motor control center subunit also includes a drive mechanism attached to the subunit housing. The drive mechanism is configured to control a plurality of line connectors to move between a retracted position and an extended position when the subunit housing is seated in the motor control center and the front panel of the subunit housing is in a closed position. A window is disposed in the front panel of the subunit housing and is positioned to provide a view of the plurality of line connectors.

In accordance with another aspect of the present invention, a motor control center includes a frame enclosing a supply power bus. The frame has at least one compartment within which a subunit housing is constructed to seat. The motor control center also includes at least one conductive contact disposed within the subunit housing. An actuating mechanism is attached to the subunit housing and is configured to move the at least one conductive contact between an engaged position and a disengaged position. A view port is disposed within the subunit housing and is configured to permit a visual confirmation of the disengaged position.

According to a further aspect of the present invention, a method of manufacturing a motor control center subunit is provided. The method includes constructing a motor control subunit to seat in a motor control center, constructing a front panel for the motor control subunit, disposing a viewing window within the front panel, locating at least one conductive connector within the motor control center subunit, and providing for advancement of the at least one conductive connector when the front panel is in a closed and locked position to supply power to the motor control subunit.

The present invention has been described in terms of the preferred embodiment, and it is recognized that equivalents, alternatives, and modifications, aside from those expressly stated, are possible and within the scope of the appending claims.

What is claimed is:

1. A motor control center subunit comprising:
   a subunit housing configured to fit within a motor control center and having a front panel;
   a drive mechanism attached to the subunit housing and configured to control a plurality of line connectors to move between a retracted position and an extended position when the subunit housing is seated in the motor control center and the front panel of the subunit housing is in a closed position; and
   a window disposed within the front panel of the subunit housing and positioned to provide a view of the position of the plurality of line connectors.

2. The motor control center subunit of claim 1 wherein the plurality of line connectors are disposed inside the subunit housing when in the retracted position and extend outside a rear surface of the subunit housing when in the extended position.

3. The motor control center subunit of claim 1 further comprising a transparent enclosure positioned about the drive mechanism and the plurality of line connectors.

4. The motor control center subunit of claim 1 further comprising a mirror disposed within the subunit housing and positioned to provide visibility of the position of the plurality of line connectors through the window.

5. The motor control center subunit of claim 1 further comprising a camera system disposed within the subunit housing and positioned to capture an image of internal components of the motor control center subunit.

6. The motor control center subunit of claim 1 further comprising a light sensor system disposed within the subunit housing and positioned to monitor a connection status of the plurality of line connectors.

7. The motor control center subunit of claim 1 further comprising a light source disposed within the subunit housing and positioned to illuminate the plurality of line connectors.

8. The motor control center subunit of claim 1 further comprising an isolator assembly configured to electrically shield the plurality of line connectors prior to engagement of the plurality of line connectors with a line power.

9. The motor control center subunit of claim 1 further comprising a disconnect configured to selectively control a supply power to motor control components of the subunit housing.

10. The motor control center subunit of claim 9 wherein the disconnect comprises a fused disconnect that is disposed within a fuse housing, the fuse housing having a selectively removable panel.

11. A motor control center comprising:
    a frame enclosing a supply power bus, the frame having at least one compartment;
    a subunit housing constructed to seat in the at least one compartment of the frame;
    at least one conductive contact disposed within the subunit housing;
    an actuating mechanism attached to the subunit housing and configured to move the at least one conductive contact between an engaged position and a disengaged position; and
    a view port disposed within the subunit housing and configured to permit a visual confirmation of the disengaged position.

12. The motor control center of claim 11 further comprising a coupler configured to selectively control a connection between the supply power bus and a supply power to motor control components of the subunit housing.

13. The motor control center of claim 12 wherein the coupler comprises one of a circuit breaker assembly and a fuse assembly.

14. The motor control center of claim 13 wherein the fuse assembly is accessible to a user when the at least one conductive contact is in the disengaged position and is not accessible to a user when the at least one conductive contact is in the engaged position.

15. The motor control center of claim 13 wherein the fuse assembly comprises at least one fuse seated within a sealed enclosure.

16. The motor control center of claim 15 wherein the sealed enclosure further comprises a removable cover.

17. The motor control center of claim 11 further comprising a reflector located within the subunit housing to enhance the visual confirmation of the disengaged position.

18. The motor control center of claim 11 further comprising a see-through housing surrounding the actuating mechanism and the at least one conductive contact.

19. The motor control center of claim 11 further comprising a light disposed within the subunit housing and positioned to illuminate the at least one conductive contact.

20. A method of manufacturing a motor control center subunit comprising:

constructing a motor control subunit to seat in a motor control center;
constructing a front panel for the motor control subunit;
disposing a viewing window within the front panel;
locating at least one conductive connector within the motor control center subunit; and
providing for advancement of the at least one conductive connector when the front panel is in a closed and locked position to supply power to the motor control subunit.

21. The method of claim 20 wherein disposing the viewing window within the front panel comprises locating the viewing window to provide a line-of-sight from the viewing window to the at least one conductive connector.

22. The method of claim 20 further comprising:

disposing a fuse assembly within the motor control subunit; and
locating the fuse assembly within a sealed sub-compartment of the motor control center subunit.

23. The method of claim 20 further comprising positioning a mirror within the motor control subunit to enhance visibility of the at least one conductive connector through the viewing window.

24. The method of claim 20 further comprising locating a light source within the motor control center to illuminate at least one internal component of the motor control center subunit.

* * * * *